Jan. 12, 1965 J. L. WALSH 3,165,637

ANALOGUE DECODER

Filed March 23, 1960

INVENTOR
JAMES L. WALSH

BY Mitchell & Bechert

ATTORNEY

United States Patent Office 3,165,637
Patented Jan. 12, 1965

3,165,637
ANALOGUE DECODER

James L. Walsh, Hyde Park, N.Y., assignor to International Business Machines Corporation, New York, N.Y., a corporation of New York
Filed Mar. 23, 1960, Ser. No. 17,179
11 Claims. (Cl. 307—88.5)

This invention relates to an analogue multichannel decoder, and more particularly to a decoder capable of producing an indication when a predetermined number of a plurality of channels are energized.

One approach to the decoder problem of producing an indication when a predetermined number of channels or input lines are energized has been to use digital techniques and standard current switching circuits. For example, in one known computer system a decoder is employed to give an indication when 25 or more of 50 input lines are energized. In this known form of decoder, the decoding function is performed using digital techniques and standard switching circuits in the form of logical blocks. This known form of digital decoder originally required the use of approximately 1400 transistors, and after considerable research and improvement, the number of circuit elements was reduced to 800 transistors and 900 diodes. Although the digital decoder performed its intended function, it was, obviously, complicated and costly as a result of the number of circuit elements.

Accordingly, it is a primary object of the invention to provide an analogue decoder which is capable of providing information regarding the number of energized input lines, and employs only a small fraction of the circuit elements required by the digital decoder.

It is a further object of the invention to provide an analogue decoder which is capable of indicating an energized condition of 25 or more lines, of a plurality of 50 input lines requiring approximately only 100 transistors and 100 diodes.

It is a further object of the invention to provide an analogue decoder capable of indicating any number of energized input lines from one to the predetermined number (e.g., 25) by employing only a few additional circuit elements.

In accordance with an aspect of the invention, there is provided a multichannel decoder adapted to produce an indication when a predetermined number of a plurality of channels are energized. The novel decoder is characterized by a current sink of given capacity, a variable current source coupled to the input of the sink and capable of producing current equal to the capacity of the sink, and means coupling the plurality of channels to the junction formed by the variable current source and the current sink. Each channel, upon being energized, applies a fixed amount of current to the sink, the capacity of the sink being less than the total amount of current applied to the junction when the predetermined number of channels are energized. The amount of current provided by the variable current source is continuously reduced proportionately as the number of energized channels increases, whereby the current applied to the sink is constant. Means are provided for detecting current in excess of the capacity of the current sink, which indicates that at least the predetermined number of channels are energized.

In accordance with another aspect of the invention, any given number of energized channels may be sensed from one to the predetermined number. This aspect of the invention is characterized by connecting a given number of fixed current sources in parallel with the channels. Each of the fixed current sources is weighted in binary and is capable of producing an amount of current equivalent to the number of channels corresponding to the binary weight. Each of the channels is coupled through a binary converter means to the fixed current sources, the output from the current sources constituting the difference between the given number of energized channels and the predetermined number.

The above-mentioned and other features and objects of this invention and the manner of attaining them will become more apparent and the invention itself will be best understood by reference to the following description of an embodiment of the invention taken in conjunction with the accompanying drawing, wherein.

Figure 1:
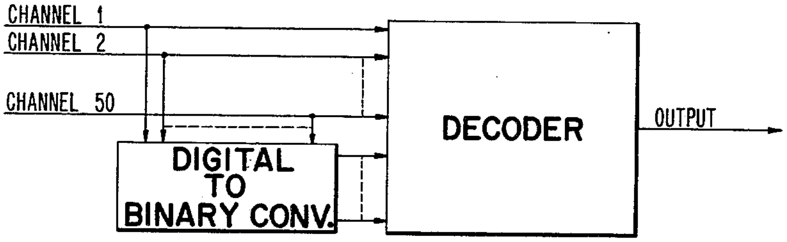
FIG. 1 is a simplified block diagram of the analogue decoder showing the application of 50 input channels, and including means for sensing any given number of energized channels up to the predetermined number.

In FIG. 1 the novel decoder is shown simply by block diagram, and by way of example is illustrated as having 50 input lines per channel; of course, more or less input lines may be employed. In addition, in FIG. 1 a digital to binary converter circuit is shown by block diagram, which circuit enhances the versatility of the decoder so that it is capable of sensing any given number of energized input lines. The given number may be any number from one to the predetermined number for which the decoder is primarily designed. For example, in one practical embodiment of the decoder, it was designed to detect the "up" or energized condition of 25 or more input lines. In accordance with standard computer terminology, the word "up" will be used to mean an energized condition or a condition of positive potential on the line. A line or channel is said to be "down" when the line is of negative potential. Thus, in FIG. 1, when the decoder senses an up condition on 25 or more lines, the output line also goes up.

Figure 2:
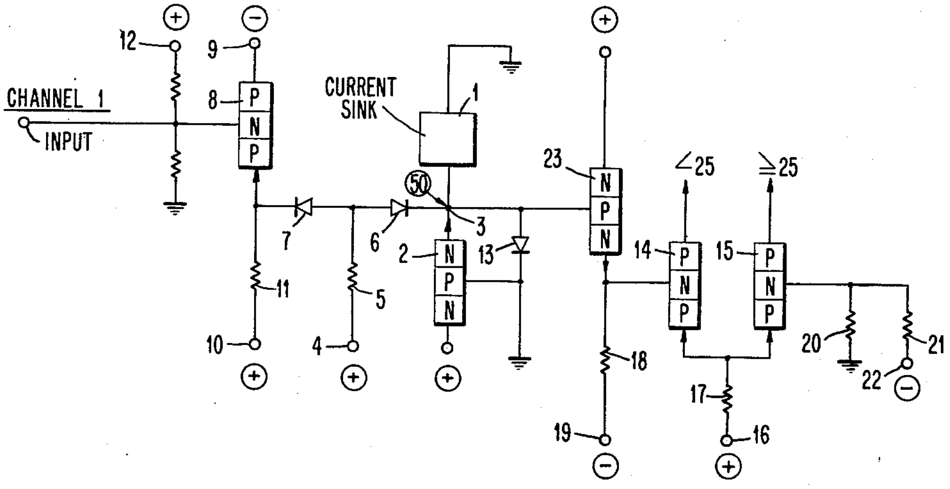
FIG. 2 is a schematic diagram of the analogue decoder.

Referring now to FIG. 2, it will be assumed that the decoder is designated to detect and give an indication of the condition when 25 or more input lines are up. The decoder comprises a current sink 1, shown diagrammatically in FIG. 2 and in detail in FIG. 3. The current sink 1 is designed to draw a fixed amount of current. For the assumed situation, the fixed amount of current may be 24½ units of current. A means 2 for providing a variable current, preferably in the form of a NPN transistor, is connected to the input of the current sink. More specifically, the emitter electrode of the NPN transistor is connected to the junction 3 between it and the input of the current sink 1. The transistor 2 is capable of supplying 24½ units of current to the current sink 1. In other words, in the absence of any other current flowing to the junction 3, the fixed amount of current drawn by the current sink 1 is produced by the transistor 2. It is apparent that in place of the transistor 2, a diode may be utilized, providing it is poled in the same direction as the base-emitter junction of the transistor, i.e., opposite to diode 13.

Channel 1 is shown coupled over a logical switching circuit to the junction 3. The remaining 49 channels of a 50-channel decoder comprise similar logical switching circuits, all multipled to the current sink 1 as suggested by the arrow at the junction 3. The current sink-variable current source combination, therefore, is common to the 50 input channels.

Each logical switching circuit is capable of producing a fixed amount of current. For example, continuing with our assumed situation of a decoder comprising 50 input lines designed to sense the condition when 25 or more input lines are up, and further assuming that the capacity of the current sink is 24½ units of current, each switching circuit comprises a fixed current source capable of supplying to the sink one unit of current. The fixed current source comprises a positive voltage supply 4 and a resistor 5. The values of the voltage supply 4 and resistor 5 determine the fixed unit of current supplied to the junction 3. The switching circuit further comprises bilateral current feeding branches consisting of diodes 6 and 7, respectively. The branch consisting of diode 6 is connected directly, to the junction 3, and the branch consisting of diode 7 is connected to a two-level impedance device, preferably a transistor 8. In its conducting condition, the transistor 8 is a low level impedance and serves to divert the fixed amount of current from the current source 4, 5 away from the junction 3. When transistor 8 is conducting, the flow of fixed current is through the diode 7, transistor 8, to the negative voltage supply 9. In its cut-off condition, the transistor 8 presents a high level impedance and the fixed unit of current from the source 4, 5 is applied through diode 6 and junction 3 to the sink 1.

The transistor 8 is preferably of the PNP type and is rendered normally conducting by the sources of biasing potential 9, 10 and emitter resistor 11. When the input line is down (negative), the conditions for rendering transistor 8 conducting are satisfied and consequently the unit of current from the source 4, 5 is conducted through the transistor 8 or diverted away from the junction 3.

When the input line goes up—that is, a positive potential is applied to the line or, as shown in the illustrated embodiment, the negative potential is removed from the line and the source of positive voltage supply 12 is coupled to the base of the transistor 8. A positive potential on the N region (base) of the transistor 8 decreases the output of the transistor and the fixed unit of current from the source 4, 5 is applied through the diode 6, junction 3, to the sink 1. Since the sink is capable of drawing only 24½ units of current, the variable current source 2 now produces only 23½ units of current. As is readily apparent, if 24 input lines are up, 24 units of current are fed by the lines through the junction 3 to the current sink 1. For this situation, the transistor 2 would supply only one-half unit of current. When the 25th input line comes up, the current flowing to the junction 3 exceeds the capacity of the sink 1, therefore cutting off transistor 2 and causing diode 13 to conduct to ground. The junction or node 3 has undergone a gradual change in potential as the current supplied by the transistor 2 decreased—that is, the potential at the junction 3 became incrementally less negative as successive input lines went up. The junction 3 became positive when the current supplied by the fixed current sources exceeded the capacity of the current sink and cut off the transistor 2. The current in excess of the capacity of the sink 1 is thereby conducted to ground through the diode 13, the diode having its positive electrode connected to the junction 3. As additional lines go up, the additional current supplied by the switching circuits associated with the respective input lines is conducted through diode 13 to ground.

Thus, it is apparent that the potential at the junction 3 is an indication of whether more or less than 25 lines are up. The potential change indicating the transition is coupled to a line-condition indicating circuit.

The indicating circuit comprises a differential amplifier arrangement comprising transistors 14 and 15. The biasing circuit for transistor 14 comprises a source of positive voltage 16, emitter resistor 17, base resistor 18 and negative voltage supply 19. The biasing circuit for the transistor 15 comprises the voltage supply 16, emitter resistor 17, base resistors 20, 21 and negative voltage supply 22. The biasing circuit component values are selected so that transistor 14 is normally conducting and transistor 15 is normally cut-off. The conduction of transistor 14 is, therefore, used to indicate the condition when less than 25 lines are up. For indicating the condition when 25 or more input lines are up, means are provided for cutting off transistor 14 and, by the nature of the differential amplifier, transistor 15 is rendered conducting to indicate the desired condition. The means for cutting off transistor 14 comprises an NPN transistor 23 having its base electrode coupled to the junction 3 and its emitter electrode coupled to the base of transistor 14. Manifestly, while the junction 3 is negative, the transistor 23 is cut off and the conduction of transistor 14 is unaffected. However, when the potential at junction 3 goes positive, the transistor 23 is rendered conducting and a positive potential is emitter-coupled to the base of transistor 14, thereby cutting off transistor 14. Cutting off transistor 14 causes transistor 15 to go into conduction which indicates the condition that 25 or more lines are up. Obviously, when the number of up lines drop below 25, conduction of transistor 2 is resumed, thereby cutting off transistor 23 and causing the bistable circuit to return to its initial condition, wherein transistor 14 is conducting.

Figure 3:
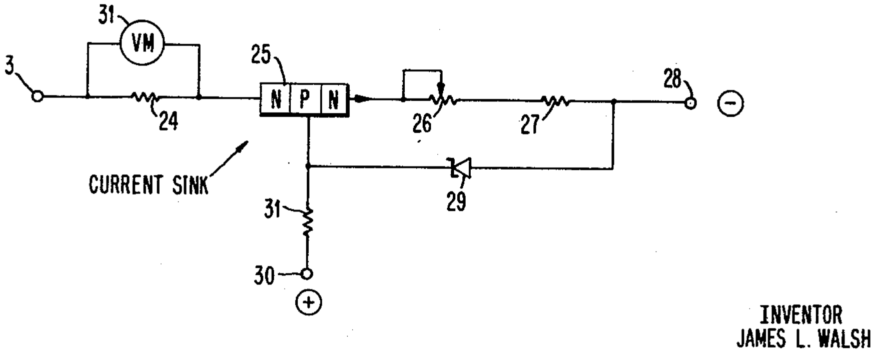
FIG. 3 is a schematic diagram of a current sink shown diagrammatically in FIG. 2.

In FIG. 3, one practical embodiment of a current sink is illustrated. It is to be understood, however, that other forms of current sinks may be employed. The current sink comprises a relatively small resistor 24, of the order of five ohms, connected to the collector electrode of an NPN resistor 25, the emitter electrode of which is connected seriatim to a variable resistor 26, resistor 27 and to a negative voltage supply 28. A Zener diode 29 is connected across the base electrode of transistor 25 and the emitter circuit including resistors 26 and 27. A positive voltage supply 30 is coupled through a resistor 31 to the negative electrode of the diode 29 and the potential difference provided by the voltage sources 28 and 30 is sufficient to cause the Zener diode to operate in its Zener region. In other words, the reverse resistance of the Zener diode is broken down. The Zener diode, therefore, together with the resistors 26 and 27 operates as a highly constant battery across the emitter-base junction of the transistor 25. A voltmeter 31 is connected across the low resistor 24 so as to permit monitoring of the current into the current sink. Since the transistor 25 draws only a very small amount of current, the current flowing through the current sink is determined primarily by the resistors 26 and 27. As a result of slight variations in the characteristics of the transistors, the resistor 26 is made variable to provide for accurate adjustment in the capacity of the current sink. In other words, the value of resistor 26 establishes the switching threshold of the decoder.

The decoder as described is capable of sensing the condition when 25 or more lines are up. In one practical embodiment of the invention, the decoder was further required to have the capability of giving an indication for any given number of lines from one to 25. To accomplish this desired versatility, five additional switches are required, which are connected in parallel with the original 50 switches. The five additional switches are weighted in binary as 1, 2, 4, 8 and 16. The "16" switch supplies sixteen units of current; the "8" switch supplies eight units of current, and so on. The inputs to the five additional switches are controlled by a decimal to binary converter, as shown diagrammatically in FIG. 1. For example, if it were desired to sense the condition of eleven or more up lines, switches "8," "4" and "2" would be switched so that 14 units of current would be applied to the current sink. The conduction of the transistor 2 will then be cut off and diode 13 rendered conducting when eleven or more input lines go up.

It is to be understood that the capacity of the current sink has been selected only for purposes of explanation. It is only essential that the capacity of the current sink be such that the number of lines minus one provide current less than the sink capacity and that the predetermined number of lines exceed the sink capacity.

It is also to be understood, of course, that the transistor types could be reversed with suitable changes in supply potentials.

While the foregoing description sets forth the principles of the invention in connection with specific circuitry, it is to be understood that this description is made only by way of example and not as a limitation of the scope of the invention as set forth in the objects thereof and in the accompanying claims.

I claim:

1. Decoding apparatus, comprising a current sink capable of passing a current up to a predetermined level; a plurality of input channels, each providing a predetermined amount of input curent when energized, coupled in common to the input of said current sink; a variable current source, also coupled to the input of said current sink, for supplying thereto a current value equal to the difference between said predetermined current level and the total current provided by the energized channels; and means coupled to said variable current source for indicating when the current supplied thereby falls below a predetermined level.

2. The apparatus according to claim 1, in which said variable current source comprises a transistor having its output circuit connected to the input of said current sink, the current generated by said transistor being controlled by the total amount of current provided by the energized channels and the predetermined current level of said current sink.

3. The apparatus according to claim 2, wherein the output circuit of said transistor, the input of said current sink and the plurality of channels are connected to a common node, and unidirectional shunting means coupled between said node and ground, and connected to pass current exceeding the predetermined level of said sink to ground.

4. The apparatus according to claim 3, wherein the energization of each channel and the application of current to said node effectively imposes a biasing potential on the output circuit of said transistor tending to reduce the current generated thereby, whereby the current generated by said transistor varies inversely with the number of energized channels, and the polarity of the biasing potential being so related said unidirectional shunting means such that when the total amount of current exceeds the predetermined level of the sink the amount in excess of such level is shunted through said unidirectional shunting means.

5. The apparatus according to claim 4, wherein said variable current source comprises an NPN transistor, the emitter electrode thereof being connected to the input of said sink, and said unidirectional shunting means comprises a diode, the anode thereof being connected to said node.

6. The apparatus according to claim 1, wherein said last-mentioned means, for indicating the condition when the current supplied to said current sink by said variable current source falls below said predetermined level, comprises a two-stage bistable circuit, means coupling the junction of said channels, variable current source and to a first stage of said bistable circuit, biasing means for normally rendering said first stage of said bistable circuit operative and the second stage inoperative, and said coupling means being responsive to said condition, when the current supplied by said variable current source falls below said predetermined level for rendering said first stage inoperative and said second stage operative, whereby the condition of said bistable circuit indicates whether the supplied current is below said predetermined level.

7. The decoding apparatus according to claim 1, and further comprising a switching circuit for coupling each of said channels, respectively, to the junction formed by the connection of said variable current source and said current sink; said switching circuit comprising a fixed current source and means responsive to an energized condition of the associated channel for directing said fixed amount of current to said junctions, whereby the total amount of current delivered to said junction is a function of the number of energized channels.

8. The apparatus according to claim 7, wherein said switching circuit comprises bilateral current feeding branches connected to said fixed current source, a first of said branches comprising a unidirectional device connecting said fixed current source to said junction, the second of said branches comprising a two-level impedance means normally operating at a first, low level of impedance for diverting said fixed amount of current away from said junction, said second branch means being coupled to a channel and operative in response to an energized condition of the channel to change its level of impedance to the second, high level, whereby the fixed amount of current is fed to said junction.

9. The apparatus according to claim 8, wherein said two-level impedance means comprises a transistor of the PNP type and biasing means for normally rendering said transistor conducting in the absence of an energized condition of said channel, the channel being coupled to the N region of said transistor and an unenergized condition of the channel being represented by a negative potential, the energized condition of said channel being represented by a positive potential sufficient to cut off said transistor.

10. A multichannel decoder adapted to indicate when a predetermined number of a plurality of channels are energized, comprising a current sink of given capacity, a variable curent source coupled to the input of said sink and capable of producing current equal to the capacity of said sink, means coupling said plurality of channels to the junction formed by said variable current source and said current sink, each of said channels upon energization thereof including means for applying a fixed amount of current to said sink, the capacity of said sink being less than the total amount of current applied to said junction when said predetermined number of channels are energized, the amount of current provided by said variable current source being reduced proportionately as the number of energized channels increases, whereby the current applied to said sink is constant, and means detecting current in excess of the capacity of said current sink for indicating that said predetermined number of channels are energized.

11. The decoder according to claim 10, and further comprising means for indicating any given number of energized channels from one to said predetermined number, said means being characterized by a given number of fixed current sources connected in parallel with said channels, each of said sources being weighted in binary and capable of producing an amount of current equivalent to the number of channels corresponding to the binary weight, and binary converter means for coupling each of said channels to said current sources, whereby the output from said fixed current sources weighted in binary constitutes the difference between said given number of energized channels and said predetermined number.

References Cited in the file of this patent

UNITED STATES PATENTS

| | | |
|---|---|---|
| 2,453,454 | Norwine | Nov. 9, 1948 |
| 2,658,167 | Harris | Nov. 3, 1953 |
| 2,885,564 | Marshall | May 5, 1959 |
| 3,086,125 | Gumin et al. | Apr. 16, 1963 |